Aug. 16, 1966   P. F. GUIENNE   3,266,757
DEVICES FOR LANDING LOADS
Filed Dec. 3, 1964   3 Sheets-Sheet 1
Fig.: 1
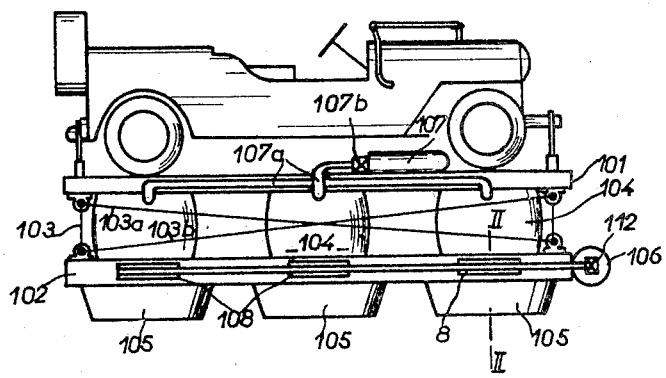
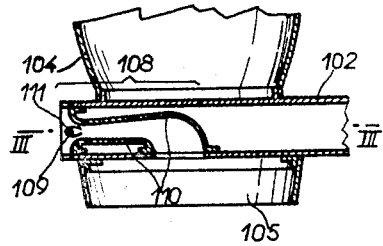
Fig.: 2
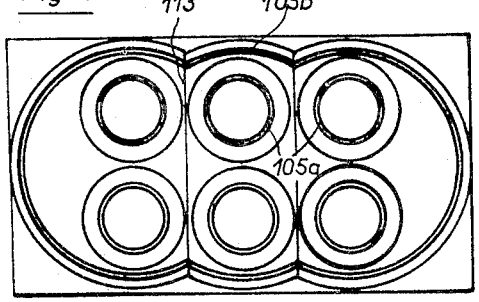
Fig.: 4
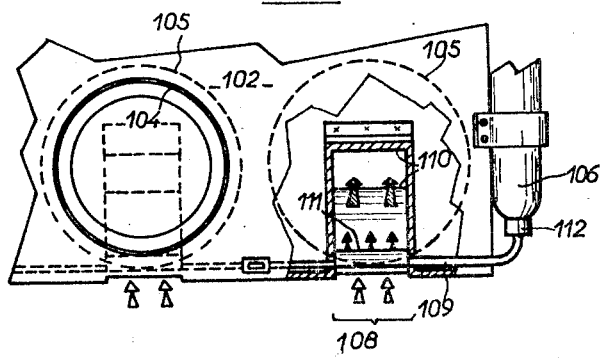
Fig.: 3
Inventor
Paul François Guienne
By Stevens Davis, Miller & Mosher
Attorneys

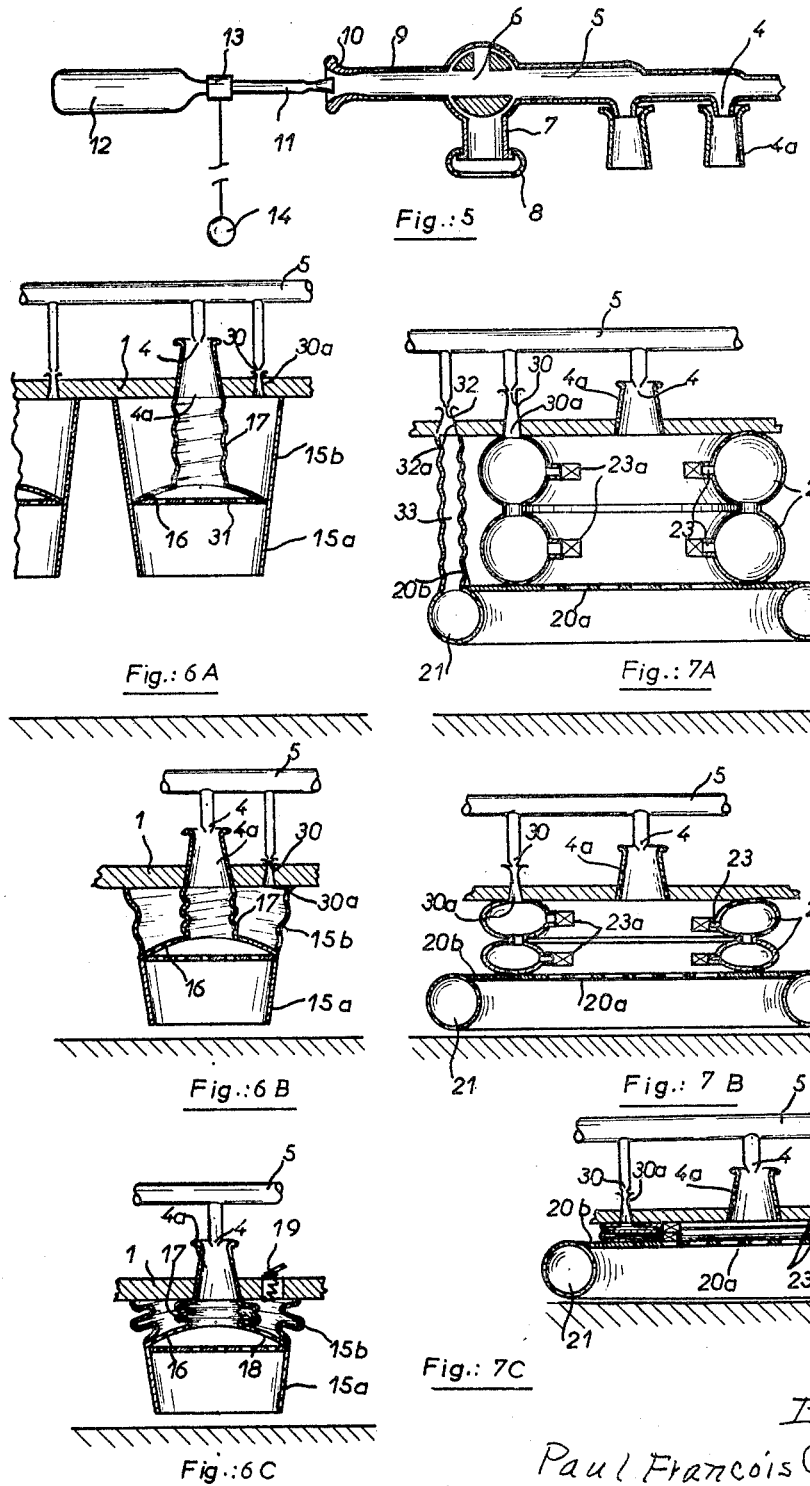

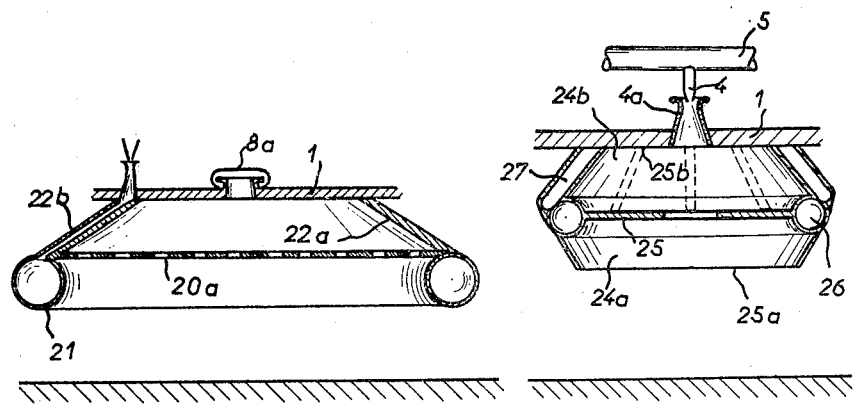
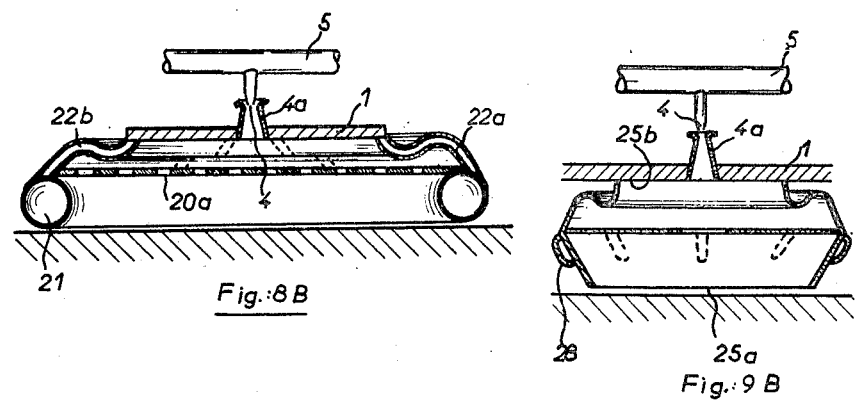
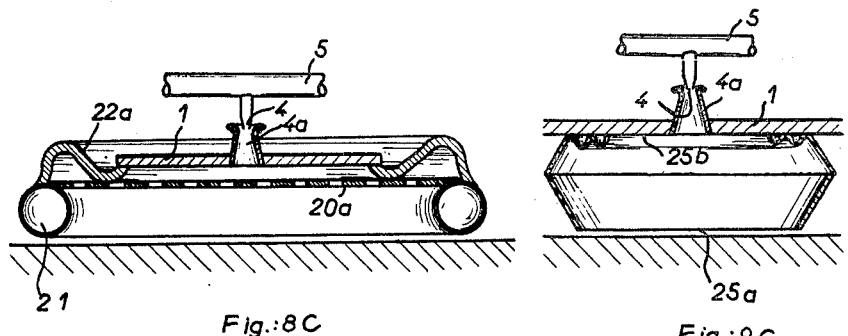

United States Patent Office 3,266,757
Patented August 16, 1966

3,266,757
DEVICES FOR LANDING LOADS
Paul François Guienne, Paris, France, assignor to Societe Bertin & Cie, Paris, France, a company of France
Filed Dec. 3, 1964, Ser. No. 415,650
Claims priority, application France, Dec. 6, 1963, 956,316; May 12, 1964, 974,182
22 Claims. (Cl. 244—138)

This invention is concerned with improvements in and relating to devices for landing parachuted loads.

It has already been proposed to reduce the impact on landing of a load falling with a vertical speed of the order of 5 to 10 m./s., and particularly a parachuted load, by locating inflated balloons under the load before impact, the balloons having a pressure such that they develop during that phase which corresponds to their flattening, a suitable reduction force. At little cost, the arrangements comprising such balloons enable the major part of a given reduction to be achieved, which determines the maximum deceleration of the load at landing but which is nevertheless limited by the need to keep the center of gravity of the load as low as possible. In fact, where a wind is blowing at the time of landing engagement of the load with the ground during impact results in the development of a couple which can be sufficient to overturn the load and damage it, thus rendering the simple balloon devices of less interest although such devices are very efficient insofar as force reduction is concerned.

It is an object of the present invention to provide an improved device for the landing of parachuted loads which will substantially reduce friction between the load and the ground on impact and hence the couple which might otherwise overturn the load in the event of there being a wind on landing.

According to the invention there is provided an improved load landing device comprising in combination a platform capable of supporting a load, at least one balloon of flexible fluid proof material located under the said platform and fast with it, means for inflating the balloon a gas under pressure, at least one skirt of flexible material located below the balloon and fast with it, said skirt being open downwards, and means for inflating the skirt with gas under pressure. The surfaces in plan and the respective internal pressures of the balloons and skirts are such that on impact substantially only the balloons will flatten.

According to a preferred embodiment, the inflation of the balloons and then the feeding of the skirts is effected from a single pressure fluid source in a known manner. An intermediate floor separates the balloons and skirts and the upper platform is guided relative to the floor by an arrangement of cables or bars located between them diagonally at their sides.

Alternatively the floor which separates the assembly of skirts from that of the balloons may be replaced by light partitions, which may be perforated, separating each elementary skirt from its associated balloon.

The sub-assembly constituted by a skirt, the associated balloons and their separating partition could be deformable as a whole but it can equally comprise stiffeners formed preferably of inflated bags. The inflation of the balloon, of the skirt and of the stiffeners can take place in various ways.

The balloons can be inflated at any time during descent, while no advantage is derived from feeding the skirts; the skirts being open, the energy used in feeding them during descent would be totally lost. For this reason, the skirts are fed only when the open end of the skirt is adjacent the ground. The sustaining gas under pressure is delivered to them preferably by means of a battery of aspirators by way of a three-way valve or the like which delivers the sustaining gas equally: before impact, by means of a gas generator carried by the load supporting platform, this generator being itself preferably a primary ejector device to which the gas is fed from a bottle; then on the ground, from a compressor carried by a vehicle. The elementary skirts can be surrounded by a peripheral skirt in a known manner. The maximum internal pressure of the balloons at impact can be limited in different ways, for example by means of a valve which permits gas contained in a balloon to escape in the event of pressure exceeding a spring loading. Alternatively, the wall of the balloon can include a double walled diaphragm which breaks on impact, the flow then being controlled by the diaphragm.

In order that the invention may be well understood there will now be described some embodiments of the invention, given by way of example only, reference being had to the accompanying drawings in which:

FIGURE 1 is a schematic elevation of a device according to the invention;

FIGURES 2 and 3 are respectively part sections along the lines II—II of FIGURE 1 and III—III of FIGURE 2;

FIGURE 4 is a schematic view from below showing that the elementary skirts can be surrounded by a peripheral flexible skirt;

FIGURE 5 shows schematically an inflation device.

The following schematic figures are in groups having references A, B and C, each group illustrating a particular embodiment of the invention.

At A the embodiment is shown during the inflation phase before impact, at B during reduction of the vertical speed of the load and at C during the course of reduction of horizontal speed or during handling of the load on the ground. Variations of detail are indicated as desirable by a single figure of a group.

FIGURES 6A, B, C thus show a first variation of embodiment of the invention showing nevertheless a variant of detail (FIGURE 6C).

FIGURES 7A, B, C and 8A, B, C show likewise a second and a third embodiment.

FIGURES 9A, B, C show a fourth embodiment, noticeable for its great simplicity.

Referring to FIGURES 1 to 3, there is shown a first embodiment of the invention, which comprises a platform 101 and a floor 102 one above the other and maintained thus by guide means formed by cables 103 extending diagonally, such as 103a and 103b, balloons 104 located between the platform and the floor, and flexible skirts 105 fixed under the floor. The balloons and skirts are for example of cloth coated with a gas-tight layer, which can have a rubber base. Their form can vary but it is preferably a figure of revolution and in the case of the skirts it is slightly conical. The height of the skirts is small and can be just sufficient for clearing obstacles in the passage of the device over the ground. The construction of the platform and of the floor will not be described in detail and can comprise a cellular structure formed by perpendicular beams and ribs, as well as by means of a covering plate. The weight of the lower floor 102 is kept as low as possible.

The compressed gas supply for the skirts and for the inflation of the balloons can be provided in various ways, for example by means of two separate compressed air bottles 106 and 107 shown in FIGURE 1. The dimensions in plan, and the relative surfaces of the skirts and balloons, are preferably such that the maximum sustaining effort provided by the balloons is substantially less than that which the skirts can develop without producing any noticeable horizontal reaction.

For example, always in relation to FIGURE 1, the balloons 104 are coupled to the bottle 107 by a supply system 107a incorporating a reduction valve 107b, which can be mechanically controlled by a line or by a barometric capsule in known manner. The supply to the skirts is preferably by means of ejector devices 108 by which the compressed air (black arrows FIGURE 3), provided from a bottle such as 106, induces ambient air (white arrows) to form the gaseous cushion defined by the skirts (hatched arrows).

Ejectors 108 are preferably of the bi-dimensional type shown in FIGURES 2 and 3, being symmetrical to either side of a plane II—II and comprising a diffuser 110 of convergent-divergent section, of which the enlarged entry is located within the edge of the platform (the load carrying platform or the floor) and within the thickness of which it is located and of which the outlet is bent, and a collector 111 from which the compressed induction gas, brought by piping 109 escapes through at least one nozzle or induction tube. The piping 109 is coupled preferably to the bottle 106 through a valve 112 which can be opened in any known fashion. For example sensing electric elements incorporated in the base of each skirt causes the valve 112 to open in contrast with the ground, through the intermediary of a known electromechanical amplifier.

FIGURE 5 shows an inflating device of improved efficiency, which brings into operation two stages of ejectors and can also have other purposes as will appear. This device comprises a battery of ejectors 4, of flattened section, fed with compressed inductor gas by a conduit 5. In conduit 5 is a three-way valve 6 to which extends, as well as conduit 5, a conduit 7 provided with a quick release coupling 8 and a conduit 9 coupled to the diffuser 10 of a primary ejector. The coupling conduit 11 of the latter is supplied preferably, by way of a valve 13 controlled by a rope 14 or the like, by a reserve bottle 12 of compressed gas.

The coupling 8 serves to secure the conduit to the outlet of a compressed gas generator of whatever type, which may be for example a turbo-compressor set for air conditioning or starting up aircraft and the outlet pressure of which may be in the neighbourhood of 3 to 5 atmospheres. This generator is located preferably, in known manner, on a vehicle for handling parachuted loads after their landing.

The bottle 12 contains for example compressed air at 200 kg./cm.$^2$.

This supply system is notable for its ease of operation and the high aerodynamic efficiency produced by the two stages of ejectors.

The pressures in the skirts and that in the balloons are set according to the conditions of use. It will be seen in FIGURE 1 that the surface in plan of a skirt is greater than that of the associated balloon so as to avoid collapse of the skirts during progressive flattening of the balloons. This dimensional condition, valid while the inflection pressures are at least substantially equal, as will appear later, can of course be extended to the assembly of skirts and balloons while their numbers are unequal. The elementary skirts 105a (FIGURE 4) can be surrounded in known manner, by a flexible peripheral skirt 105b comprising preferably several circular lobes maintained by ties 113.

The balloons 104 are provided preferably with discharge means for limiting their internal pressure during impact. These means can function once for all or may operate progressively to ensure a pressure difference having a definite upper limit between the interior of the balloon and a neighbouring space.

The function of the landing device appears from the preceding description.

The launch of a load on the platform is followed by supply of gas to the balloons 104 by opening of valve 107b. This is actuated, for example, either by a line coupled to the launching aircraft or by a barometric capsule. The sensing elements incorporated in the base of each skirt for example, cause, on contact with the ground, the valve 112 to open through the intermediary of an electromechanical device. The skirts 105 are then in process of developing, without noticeable collapsing or friction with the ground, a lifting force greater than the product of the mass of the load and of platform 101 together with its accessories and the vertical deceleration determined by the progressive flattening and control of the balloons, a deceleration of the order of 5g. The impact comprises several phases which follow one another very rapidly.

First the relatively light floor 102 is stopped very rapidly with a deceleration which may be high, but without collapse of the skirts.

Thereafter the balloons 104 flatten progressively by opening of diaphragms or valves opened by the internal pressure which in this phase tends to rise more rapidly than that of the skirts. At this end of this phase, the platform resets on the floor through the flattened balloons and later through auxiliary stops provided for the purpose.

During these two phases, the landing device and the load which initially have a certain horizontal velocity equal to the prevailing wind, slide on the ground surface on the gas cushions within the skirts and the friction of these on generally flat ground is sufficiently small to prevent the load overturning. The diagonal couplings 103 between the platform and the floor provide for relative horizontal movement.

When the horizontal travel of the load is completed the skirts can in their turn collapse by cutting their supply, such cut off occurring on exhaustion of the reserve in bottle 106, by remote control or a timing device included in opening mechanism of valve 112.

The variants shown in FIGURES 6 to 9 are characterised by the inclusion of an elementary skirt surrounding an air cushion carrier and of an elementary balloon the flattening of which provides a progressive reduction of the vertical speed of the load, in the absence of an intermediate floor common to the assembly of balloons and skirts. The height of the balloons must be as much greater than the vertical speed of the load before impact is itself greater than the chosen deceleration small.

The inflation and supply of the various parts of the device occurs across orifices 4, 30, 32 which can be provided with ejectors 4a, 30a, 32a, shown schematically in the drawings. A neutral supply 4 of the skirts or balloons can depend on ballast at the lower edges of the skirts or can be obtained by inflation of the walls proper or by stiffeners in the latter. The dynamic pressure is sufficient during descent to form in the skirt, as well as in the associated balloon if desired, a reserve of air which the progressive flattening of the balloon expels between the ground and the skirt, thereby sufficiently reducing friction with the ground during the force reduction phase to avoid overturning of the load.

In FIGURES 6A, B and C a skirt and the associated balloon have deformable lateral walls 15a, 15b which are the superposed parts of the trunk of a cone, of cloth impervious to gas, reinforced rubber or any other deformable material and preferably elastic. A partition 16 separates the skirt from the balloon and is coupled to the platform 1 by an extensible supply sleeve 17, for example a concertina. A permeable partition 31 can be provided to ensure the desirable spread of gases arriving in the skirt by way of the sleeve. Skirt and balloon, thus isolated, are supplied with compressed gas respectively through orifices 4 and 30. In FIGURES 6A and 6B their supply is always independent while in FIGURE 6C the partition 16 shows discharge orifices 18 into the balloon 16, for the cushion air in the skirt. Moreover, in this latter figure, the balloon is itself provided with a relief valve 19 for discharge to atmosphere.

It will immediately be seen that if the internal pressure of the balloon is less than the pressure of the air cushion carrier, the lateral wall of the balloon as well as the supply sleeve for the skirt will flatten on impact without the skirt itself decreasing in height. This flattening appears in FIGURES 6B and 6C which correspond respectively to reduction of vertical speed of the load and later horizontal displacement of the load on the cushion of air.

The pressure difference between the balloon and the skirt can be due simply to the characteristics of the ejectors which individually feed these. As an alternative, and as shown in FIGURE 6C, this difference can be set by the spring of valve 19 for discharge of the balloon.

According to a second embodiment shown in FIGURES 7A, B, C the partition 20a separating the force reduction balloon from the air cushion carrier, if it exists is gas permeable to allow equalisation of the internal pressures. The lateral wall of the skirt comprises at least one inflated torus 21, as well as the lateral wall 22 of the balloon whose section in plan is always necessarily smaller. For example, the torus 21 forming the skirt is sealing tight when the or each torus 22 which surrounds the balloon are put in communication by passages 23 with the interior of the balloon. The passages 23 may be provided with biased valves 23a or membranes which will rupture at a predetermined pressure in the toruses 22 as shown in FIGURE 7A. The torus 21 forming the skirt can likewise be inflated by way of an orifice 32 of conduit 5 which orifice is coupled by a flexible pipe 33 to the torus and is provided with an aspirator 32a.

On impact the pressure increase in the skirt bears on the annular crown 20b which separates rings 21 and 22 so that the balloon flattens progressively, the air escaping from toruses 22 which form the side wall and passing into the skirt by way of the partition 20g and thence to atmosphere.

FIGURE 7C shows that the weight of the load can very well be supported by the skirt 20b, 21 without the balloon developing sufficient force to recover the height thereof before impact by raising the device with its load.

FIGURES 8A, B and C show in like manner a variation where the lateral wall 22a of the balloon is a truncated cone. This wall can be reinforced by inserts or stiffeners formed for example by inflated bags 22b located in radial planes. Such a variant can have a ground engaging surface which is much superior to that of the associated platform.

The manner ow operation remains the same. It appears possible by reason of the rigidity of the balloon-skirt assembly to inflate during descent simply torus 21 surrounding the skirt and the stiffeners 22b, the dynamic pressure sufficing to form in the skirt and balloon, during descent, a reserve of air which the progressive flattening of the balloon drives between the ground and torus 21, thereby sufficiently reducing the friction during the reduction to avoid overturning the load.

When handling after landing, a conduit can be coupled at 8a to the platform 1 and to an air compressor carried by a vehicle.

Of course, the cushion carrier and balloon can be permanently fed during impact by means of a pump, as well as the inserts 22b and even the torus 21 surrounding the cushion.

FIGURES 9A, B, C relate to a simplified embodiment in which the lateral wall 24 defines an air cushion carrier and the associated balloon is in the form of a double truncated-conical element, the truncated cones 24a and 24b having a common major base and the small upper end 25b presenting a smaller surface than the small lower base 25a. To facilitate deployment of the skirt before impact and to increase the rigidity of such a bi-conical skirt, the skirt can be completed by stiffeners incorporated in a partition located in the plane of the large base 25 or in said wall. The stiffeners are preferably formed by inflatable bags 26, 27 incorporated in the walls of the balloon (FIGURE 9A). A biased valve can be provided to allow discharge of the balloon as well as other stiffeners, 28, incorporated in the lateral wall of the skirt and at least momentarily inflatable in the course of descent (FIGURE 9B).

The function of such a bi-conical skirt is similar to that of the devices shown in the preceding figures. By virtue of the relative dimensions of the small ends 25a and 25b of the truncated cones, the flattening of the balloon occurs without appreciable deformation of the skirt. However, the configuration of equilibrium does not correspond to the complete flattening of the balloon. During handling on the ground, the balloons are completely flat while the skirts continue to play their full role.

In all cases the device exhibits great stability preventing any tendency to overturn the load, as well as being very light.

It follows that the invention is not limited to the precise embodiments described but can cover those obtainable by adopting technical equivalents. In particular, the feed described for any one of the embodiments can be applied to any other. It is even possible to use a single balloon-skirt assembly.

What is claimed is:

1. An improved load landing device comprising in combination a platform capable of supporting a load, at least one balloon of flexible fluid proof material located under the said platform and fast with it, means for inflating the balloon with gas, at least one skirt of flexible material located below the balloon and fast with it, said skirt being open downwards, and means for feeding gas into the skirt to form an air cushion when the open end of the skirt is adjacent the ground.

2. A landing device according to claim 1, in which the surfaces in plan and the internal pressures respectively of the balloon and skirt are chosen so that substantially only the balloon flattens on impact.

3. A landing device according to claim 1, in which an intermediate floor separates the balloon from the skirt.

4. A landing device according to claim 3, in which tension members are located diagonally between the platform and the floor on each side of these, to maintain them one above the other during landing.

5. A landing device according to claim 1, in which the inflation means of at least the skirt comprise an ejector device for inducing ambient air.

6. A landing device according to claim 5, in which the ejector device is a two stage ejector, a compressed gas bottle supplying the higher pressure stage and a three-way valve being provided between the stages to allow an outside supply to the lower pressure stage after landing.

7. A landing device according to claim 2, in which the wall of a balloon carries means limiting the internal balloon pressure during impact.

8. A landing device according to claim 7, in which the pressure limiting means comprise a valve normally spring biased closed.

9. A landing device according to claim 1, in which a plurality of balloons and skirts are provided, a skirt and a superposed balloon forming an assembly independent of other such assemblies.

10. A landing device according to claim 9, in which the lateral wall of the assembly of a superposed balloon and skirt comprise at least a part being a truncated cone.

11. A landing device according to claim 10, in which the skirt has a truncated conical lateral wall, an open lower small end and an upper larger end common with the associated balloon, the lateral wall of the balloon being likewise a truncated cone.

12. A landing device according to claim 11, in which the cone angles of the skirt end of the balloon are opposed.

13. A landing device according to claim 12, in which the cone angles of the skirt and balloon are directed in the same sense.

14. A landing device according to claim 13, in which the cone angles of the skirt and balloon are equal.

15. A landing device according to claim 9, in which the partition which separates a skirt from a superposed balloon is gas-tight, an extensible sleeve coupling the partition to the platform for the load.

16. A landing device according to claim 9, in which the lateral wall of the elementary assembly formed by a balloon and a superposed skirt comprise at least one inflatable toric part.

17. A landing device according to claim 16, in which the inflatatable toric wall includes a discharge orifice at the interior of the assembly.

18. A landing device according to claim 16, in which an elementary balloon and skirt both have a lateral wall formed by at least one inflatable torus and are separated by a perforated partition.

19. A landing device according to claim 18, in which the surface in plan of the balloon is less than that of the associated skirt.

20. A landing device according to claim 16, in which a skirt having a lateral toric wall is combined with a balloon having a truncated conical lateral wall, said balloon being secured to the platform at its upper part on a section less than that by which it is secured to the skirt at its lower part.

21. A landing device according to claim 9 comprising stiffeners in the form of inflatable bags incorporated in the lateral wall of the assembly.

22. A landing device according to claim 1 in which the height of the skirt is less than that of the balloon.

References Cited by the Examiner

UNITED STATES PATENTS

| | | | |
|---|---|---|---|
| 2,712,913 | 7/1955 | Stanley | 244—138 |
| 2,958,487 | 11/1960 | Fraebel | 244—138 |
| 3,128,970 | 4/1964 | Tinajero et al. | 244—100 |
| 3,156,442 | 11/1964 | Pourchet | 244—138 |

MILTON BUCHLER, *Primary Examiner.*

L. C. HALL, *Assistant Examiner.*

UNITED STATES PATENT OFFICE

CERTIFICATE OF CORRECTION

Patent No. 3,266,757                                               August 16, 1966

Paul François Guienne

It is hereby certified that error appears in the above numbered patent requiring correction and that the said Letters Patent should read as corrected below.

Column 3, line 20, for "contrast" read -- contact --; column 4, lines 38 to 40, for "The height of the balloons must be as much greater than the vertical speed of the load before impact is itself greater than the chosen deceleration small." read -- The greater the vertical speed of the load before impact and the smaller the chosen deceleration, the greater the height of the balloons. --; column 5, line 45, for "ow" read -- of --; column 6, line 69, for "end" read -- and --; line 71, for the claim reference numeral "12" read -- 11 --.

Signed and sealed this 25th day of February 1969.

(SEAL)
Attest:

Edward M. Fletcher, Jr.                                       EDWARD J. BRENNER

Attesting Officer                                                     Commissioner of Patents